H. B. DOUGLASS.
GAGE.
APPLICATION FILED FEB. 17, 1919.
1,339,384. Patented May 11, 1920.
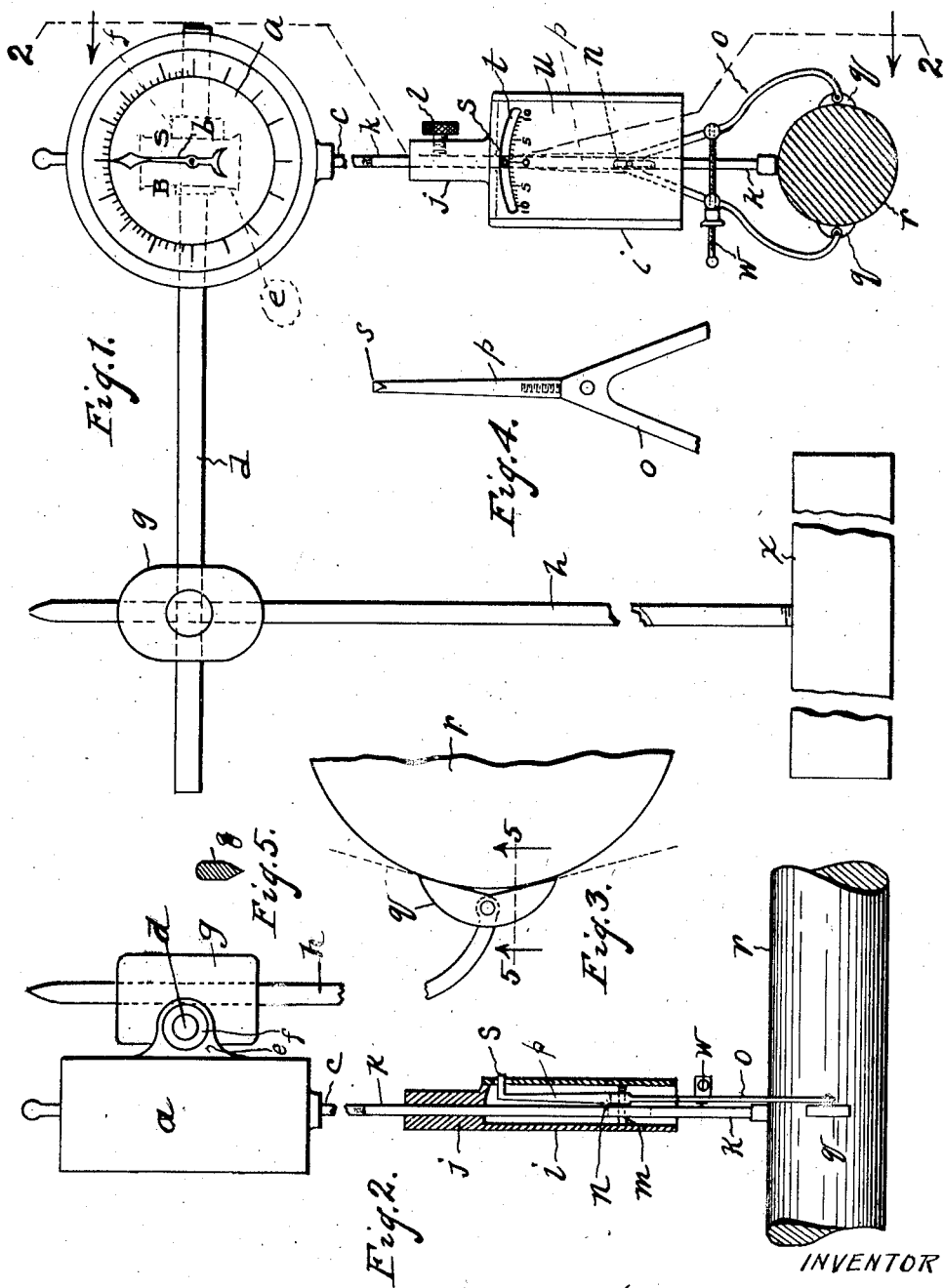
INVENTOR
Harry B. Douglass
BY Stuart E Barnes
ATTORNEY

UNITED STATES PATENT OFFICE.

HARRY B. DOUGLASS, OF DETROIT, MICHIGAN.

GAGE.

1,339,384.  Specification of Letters Patent.  Patented May 11, 1920.

Application filed February 17, 1919. Serial No. 277,410.

*To all whom it may concern:*

Be it known that I, HARRY B. DOUGLASS, a citizen of the United States, residing at Detroit, county of Wayne, State of Michigan, have invented a new and useful Improvement in Gages, of which the following is a specification.

This invention relates to gages and has for its object an attachment for what is generally known as an indicator. The "Brown & Sharp" indicators are devices provided with a properly calibrated dial and a pointer for taking very minute measurements of variations and are usually divided into one thousandths of an inch. These indicators are in quite common use in large factories in securing parallelism of the bores of the head and tail stocks of lathes with the longitudinal ways. A test bar is put into each of the head stock and tail stock and horizontal and vertical measurements are taken of the test bars at different points along their length to find out whether they are parallel with the axis of the machine. These measurements require re-location of the instrument for each position at which the measurements are taken and involve considerable difficulty and time.

It is the object of the present attachment to indicate any variation of the test bar from parallelism with the line of travel of the head stock. All that it is necessary to do is to adjust the attachment to the test bar and pass the indicator stand along the test bar or the test bar through the indicating devices in a path parallel to the general axis of the machine.

In the drawings,—

Figure 1 is a side elevation of the ordinary indicator and indicator stand showing my attachment in place.

Fig. 2 is a section on the line 2—2 of Fig. 1.

Fig. 3 is an enlarged detail of one of the two-point contact feet of the calipers.

Fig. 4 is a detail showing how the pointer arm and calipers screw together.

Fig. 5 is a section on the line 5—5 of Fig. 3.

The Brown & Sharp indicator is designated $a$ and is an instrument that is well known in machine work and can be had upon the market. Its specific construction need not be dealt with other than to say that the pointer $b$ on the face of the dial points to graduations on the dial which indicate minute divisions such as thousandths of an inch. On the side of the indicator there issues a small stem $c$ which is pressed outward by a delicate spring. Any pressing of the stem inward takes effect by turning the pointer about the dial giving in accurate markings on the face of the dial the exact distance the stem has traveled. It has been customary to mount this indicator upon an arm $d$ which is at its end screw-threaded to pass through the lug $e$ on the back of the indicator $a$. A thumb nut $f$ can be used to hold the indicator in angular position within its turning range. It will be understood that within this range the vertical position shown in the drawings or the horizontal position may be obtained. The arm $d$ is adjustable through the block $g$ while the block $g$ is adjustable up and down the post $h$ which is supported in upright position by the block $x$, which can be rested upon the bed of the machine.

In the position shown in Fig. 1 the indicator is shown in the position that it would take when, according to previous practice, a vertical measurement is to be taken of the test bar. Heretofore, after the measurement has been taken the arm, block, and indicator have to be adjusted with respect to each other to bring the indicator down at the side of the test bar and the measurement has to be taken with the stem $c$ horizontally disposed at the side of the test bar. These two measurements have to be noted, then the stand has to be shifted along the test bar and measurement taken at another point in the same way and the vertical and horizontal measurements noted and compared with the vertical and horizontal measurements taken in the previous position. Only then can it be determined whether the test bar is in true parallelism with the longitudinal ways of the machine.

This indicator stem $c$ is ordinarily provided with a tapped hole in its end in which engages a head with a threaded stem. This head (not shown) can be screwed out of the end of the stem $c$ and my attachment connected up with the stem $c$ in the same manner. The attachment comprises a case $i$ rather flat and rectangular provided with a neck portion $j$ having a bore therethrough adapted to just fit over a spindle $k$. By the use of the set screw $l$, this neck may be fastened at various points along the spindle $k$ thereby adjusting the relation of the case to the spindle $k$. Within the case $i$ is a pivot pin $m$. The spindle $k$ is slotted at $n$ so that this pivot pin passes directly through the spindle $k$. Above the spindle on the pivot pin is pivoted the pointer arm $p$, on the lower end of which is removably attached (Fig. 4) a pair of spring calipers $o$ having feet in the form of V-like pivoted blocks $q$ so that each arm of the pair of calipers has a two-point bearing on the side of the test bar $r$. This pointer arm has an indicating point $s$ on the other end which swings over a segmental slot $t$ in the lid $u$ of the case. This is graduated as indicated in the drawings. $w$ represents the usual screw and nut arrangement for limiting the spread of the calipers.

The calipers are spring arm calipers. The screw and nut are adjusted so that the distance between the ends of the caliper arms is somewhat less than the diameter of the test bar. Hence the arms have to be spread to encompass the test bar and will not stay on the test bar unless they are at diametrically opposite points. The two-point contact feet enable the spring arms to cling to the test bar on a diametric line. If the pointer $s$ is at zero the operator knows that this diametric line is perpendicular to the axis of the spindle $k$. This is the better way to have the devices when a test is made for parallelism.

If the indicator stand be moved along the test bar either by clamping the stand to the longitudinally moving carriages of the machine or by moving the test bar by moving the head or tail stock, it can be easily determined whether the test bar is in parallel condition with the general axis of the machine. If the test bar tilts upward or downward from the desired position, this will be indicated by the pointer on the dial. If the test bar varies to the right or the left of a parallel position, this immediately causes the pointer arm to move away from the position it occupied when the movement started. It, therefore, can be determined at once whether the bar is in a true condition of parallelism to the general axis of the machine. These tests are usually required to be made after the head and tail stocks have been removed and the ways scraped.

It will be obvious that the indicator does not have to be vertically above the test bar. In fact, the indicator stem can be horizontal and the calipers in vertical position. The spring caliper arms and two-point contact feet perform the very useful function of compelling the calipers to always cling to a center line of the test bar, which is necessary in order to properly indicate lateral variations of the test bar from a true parallel line. Of course, when such lateral variation is indicated this introduces an error into the vertical measurement of the stem $c$ but the proper course is to correct one error at a time. Correct the lateral variation and then again test the bar for vertical variations.

What I claim is:

1. In an instrument for indicating variations from a state of parallelism, the combination of an indicator provided with an operating stem to contact the object undergoing measurement, and a second pivoted indicating member provided with one or more arms to engage the object at substantially ninety degrees from the contact point of said stem for indicating variations in a plane angularly related to the plane in which said stem functions.

2. The combination with an indicator provided with a stem and devices for indicating the movements of the stem, of an attachment connecting up with the stem and provided with a spindle for engaging the member upon which measurement is made, and arms engaging the sides of the member on which measurement is to be made, the spindle indicating variation in one line and the arms indicating variation in a line angularly related to the spindle.

3. The combination with an indicator provided with a stem and devices for indicating the movements of the stem, of an attachment connecting up with the stem comprising a spindle whose end is adapted to rest upon the member undergoing measurement, a pair of calipers resting on points angularly related to the point of contact of the spindle and provided with a pointer arm in pivotal relation with said spindle, the said spindle and calipers indicating the variation of the member undergoing measurement from a state of parallelism with respect to a given line of travel.

4. The combination with an indicator provided with a stem and devices for indicating the movements of the stem, of an attachment securable to the said stem and comprising a casing provided with a segmental slot having graduations, a spindle passing through said casing and adapted to rest on the member undergoing measurement, and a pair of calipers pivoted to the casing and provided with a pointer arm swinging through the segmental slot, said calipers adapted to engage the sides of the member undergoing measurement and with the spindle to indicate its variation from a state of parallelism with a given line of travel.

5. The combination with an indicator provided with a stem and devices for indicating the movements of the stem, of an attachment comprising a spindle whose end is adapted to rest on the member undergoing measurement, a casing adjustable along said spindle and provided with a graduated portion, and a segmental slot, a pair of calipers pivoted to the casing and having a pointer arm adapted to swing through the segmental slot and adapted to engage the sides of the member undergoing measurement and with the spindle to indicate the disposition of such member with respect to a state of parallelism to a given line of travel.

6. The combination with an indicator provided with a stem and devices for indicating the movements of the stem, of an attachment comprising a case having a neck portion, a spindle passing through said neck portion and securable to the stem of the indicator, and a pair of spring calipers provided with pivoted two-point contact feet and pivotally supported in the casing and having a pointer arm adapted to swing over graduations in the casing, said spindle and calipers serving to show variations from parallelism with a given line of travel.

7. The combination with an indicator provided with a stem and a device for indicating the movements of the stem, of a pair of calipers in pivotal relation with and supported by the stem and having means by which they maintain contact with a cylindrical member on a diametric line thereof, whereby said pivoted calipers indicate variations in a plane angularly related with respect to the plane along which the indicator stem functions.

8. In a measuring instrument, a pair of spring calipers pivotally mounted and provided with pivoted two-point contact feet for maintaining a center line in measuring a cylindrical member.

9. In a measuring instrument, the combination of a device for measuring minute variations and a pair of spring calipers operable in connection therewith provided with pivoted two-point contact feet for maintaining a center line in measuring a cylindrical member and for indicating variations laterally of the first-mentioned measuring device.

10. A device for finding the center line of a cylindrical member, comprising a pair of caliper arms having their points yieldingly tending together, and a pair of pivoted two-point contact feet supported at the points of the caliper arms.

In witness whereof I have hereunto set my hand on the 5th day of February, 1919.

HARRY B. DOUGLASS.